United States Patent [19]

Hankinson

[11] Patent Number: 5,758,138
[45] Date of Patent: May 26, 1998

[54] METHOD AND SYSTEM FOR REDUCING NUMERIC COUNTING LEVELS IN RESAMPLING CONTROL CIRCUITRY

[76] Inventor: Robert J. Hankinson, 2034 Oakbluff Dr., Carrollton, Tex. 75007

[21] Appl. No.: 576,943

[22] Filed: Dec. 22, 1995

[51] Int. Cl.⁶ .................. G06F 1/14; G06F 3/05; G06F 7/02
[52] U.S. Cl. .......... 395/557; 375/376; 364/724.11; 364/DIG. 1; 364/DIG. 2
[58] Field of Search ................ 395/200.11, 800, 395/139, 200.33, 200.15, 280, 557, 200.8, 297; 348/581, 717, 608, 718, 561, 567, 563; 358/528, 500, 451, 514 R, 724.1; 364/608, 723, 719, 718, DIG. 1, 514 R, DIG. 2, 724.11; 360/53, 39, 49; 370/522; 382/298, 264, 229; 331/1 A, 25; 375/376

[56] References Cited

U.S. PATENT DOCUMENTS

| | | | |
|---|---|---|---|
| 4,020,332 | 4/1977 | Crochiere et al. | 364/723 |
| 4,282,546 | 8/1981 | Reitmeier | 348/580 |
| 4,442,412 | 4/1984 | Smith et al. | 331/1 A |
| 4,460,890 | 7/1984 | Busby | 341/61 |
| 4,472,785 | 9/1984 | Kasuga | 364/718 |
| 4,602,285 | 7/1986 | Beaulier et al. | 358/528 |
| 4,872,064 | 10/1989 | Tutt et al. | 382/298 |
| 5,101,369 | 3/1992 | Torii et al. | 364/724.1 |
| 5,113,455 | 5/1992 | Scott | 382/298 |
| 5,138,672 | 8/1992 | Hirabayashi et al. | 382/264 |
| 5,196,934 | 3/1993 | Fleischman et al. | 348/581 |
| 5,355,328 | 10/1994 | Arbeiter et al. | 364/724.1 |
| 5,384,904 | 1/1995 | Sprague et al. | 395/139 |
| 5,402,513 | 3/1995 | Schafer | 382/298 |
| 5,422,827 | 6/1995 | Niehaus | 364/514 R |

*Primary Examiner*—Daniel H. Pan
*Attorney, Agent, or Firm*—Fulbright & Jaworski; Steven A. Shaw

[57] ABSTRACT

A method and system in which the numeric values to which counters in resampling control circuitry may be reduced. As a result, smaller registers to hold such reduced numeric values may be designed into hardware implementing said circuitry. These smaller registers present savings in processing power and hardware allocation, thereby potentially improving response times and cost efficiency of said hardware.

24 Claims, 3 Drawing Sheets

# METHOD AND SYSTEM FOR REDUCING NUMERIC COUNTING LEVELS IN RESAMPLING CONTROL CIRCUITRY

TECHNICAL FIELD OF THE INVENTION

This invention relates to control over data resampling and more specifically to resampling control circuitry whose processing power requirements are sensitive to the numeric levels to which such circuitry may count in analyzing data to be resampled.

BACKGROUND OF THE INVENTION

It is well understood in the video art that adaptations of sampled digital data, such as resizing a pixelated image, may be accomplished using resampling techniques. In the resized image example, an image will have already been digitally sampled, and interpolation or decimation of the samples may be required to make the image larger or smaller respectively. Generation of new samples according to the required interpolation or decimation is normally enabled by circuitry controlling a resampling filter. The resampling filter then analyzes the existing sampling data and creates new samples from characteristics of the existing samples according to design functionality of the particular filter.

The present invention is directed to control circuitry of the resampling filter. Conventional techniques in controlling a resampling filter use logic whereby an instruction to generate a new sample is created according to a step, which is a function of the interval of the existing samples. In the application of resizing a video image, it will be understood that the step may be a function of the scale factor by which the image is to be enlarged or reduced.

Control logic is known where input counters increment numerically the existing samples as they are encountered in the incoming data stream, as "source" counters (referring to an eventual "source" signal for the resampling filter) increment values of the chosen step in partial synchrony with the input counters. Between each increment of the input counter, the input counter is compared with the integer value of the source counter, and if greater than or equal to the integer value of the source counter, the circuit will (1) send an instruction to the resampling filter to generate a sample, and (2) increment the source counter by one step. In decimation, the input counter will then also be incremented by one. In interpolation, however, the input counter may or may not then be incremented, depending on whether the step value is sufficiently large to cause another data sample to be encountered.

If, on the other hand, the integer value of the source counter is determined to be less than the input counter, then the circuit will not send an instruction to the resampling filter and instead will simply allow the cycle to repeat by adding one more to the input counter. This existing art is illustrated in FIG. 3, and will be discussed in greater detail below.

It is a necessary evil of this type of resampling control to have to analyze the entire length of the incoming data stream before the resampling exercise can be completed, (and, in the application suggested above, the video image can be resized). This means that all of the existing input samples must be counted before the job is done. And, according to the conventional technique described above, this means that the input and source integer counters may have to increment to high values. This creates problems in hardware design and performance. First, registers must be allocated for the input counter and the integer value of the source counter to receive count values of considerable size. This represents potentially inefficient use of hardware, and also requires that a fixed maximum register size must be pre-designed. Second, considerable processing power must be allocated incrementing these registers to high values as the incoming data stream is analyzed. This draw on processing power may take capacity away from other functions as well as potentially slowing response time. With regard to processing power, it will be understood that when counting, a savings of only one or two bits may result in exponential decrease in processing power requirements.

Accordingly, a need exists for resampling filter control circuitry that will resample an incoming data stream without incrementing counters to high values. Specifically, it would be highly desirable to control the resampling of a given data stream by counting to lower values, especially if the limits of such control were more flexible, and not directly dependent on some pre-designed maximum data sample count.

SUMMARY OF THE INVENTION

One advantage of this invention is that it reduces the numeric values to which resampling filter control circuitry may need to count in resampling a data stream of a given length. As more fully described below, the invention does this by recognizing that once the logic has sent one or more instructions to resample, much of the numeric value of the input count and the source integer count has become essentially redundant, and may be cleared.

The present invention therefore makes periodic adjustments to reduce the input count and the source integer count as instructions to resample are sent. By doing this, the numeric capacity of these counters becomes independent of the length of the data stream being analyzed, and instead becomes a function of the particular step being used in the resampling process. As applied to the example of resizing a video image, this means that the required numeric capacity of these counters becomes a function of the numeric value of the resize scale rather than of the size of the image.

Another advantage of this invention is that it improves speed and cost-effectiveness in hardware. Once again with reference to the example of resizing a video image, let it be assumed that a full screen video image on a 1024 pixel/line computer monitor is desired to be reduced to a screen icon 32 pixels wide. The reduction scale is 32:1, and, assuming linear resampling, the decimation step will be 32. Under conventional resampling control circuitry, 11-bit registers capable of storing binary count values of at least 1024 would be required. As will be shown in greater detail below, with the present invention, 6-bit registers capable of storing binary count values of only 32 will be required. As a result, considerable potential savings on processing power may contribute to faster, more cost-effectively designed hardware.

Yet another advantage of the invention is that control over resampling is now no longer directly dependent on a pre-designed maximum length of data stream that may be resampled. Although having limits related to data stream length, the invention's key design parameter is step. Thus, in theory, any length data stream may be resampled to a limit of a pre-designed maximum step. Of course, a data stream length limitation may arise above which the maximum step, when applied to that data stream, is no longer compatible with the level of interpolation or decimation desired of the resampling. Before that limit is reached, however, the invention will have provided substantially improved flexibility and processing power economy in resampling. Further, again with reference to the video image resizing example, a practical application of the invention suggests that in normal use, enlargement or reduction of images much above a factor of 64 would be highly specialized.

It will be further recognized that although the foregoing summary has been illustrated by reference to an example of resizing a video image, those of skill in this art will understand that the present invention as described herein is not limited to such applications. Being directed to control circuitry over resampling generally, it will be understood that the present invention has applications wherever faster, more cost-effective, and/or more flexible control over resampling may be advantageous.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 3:
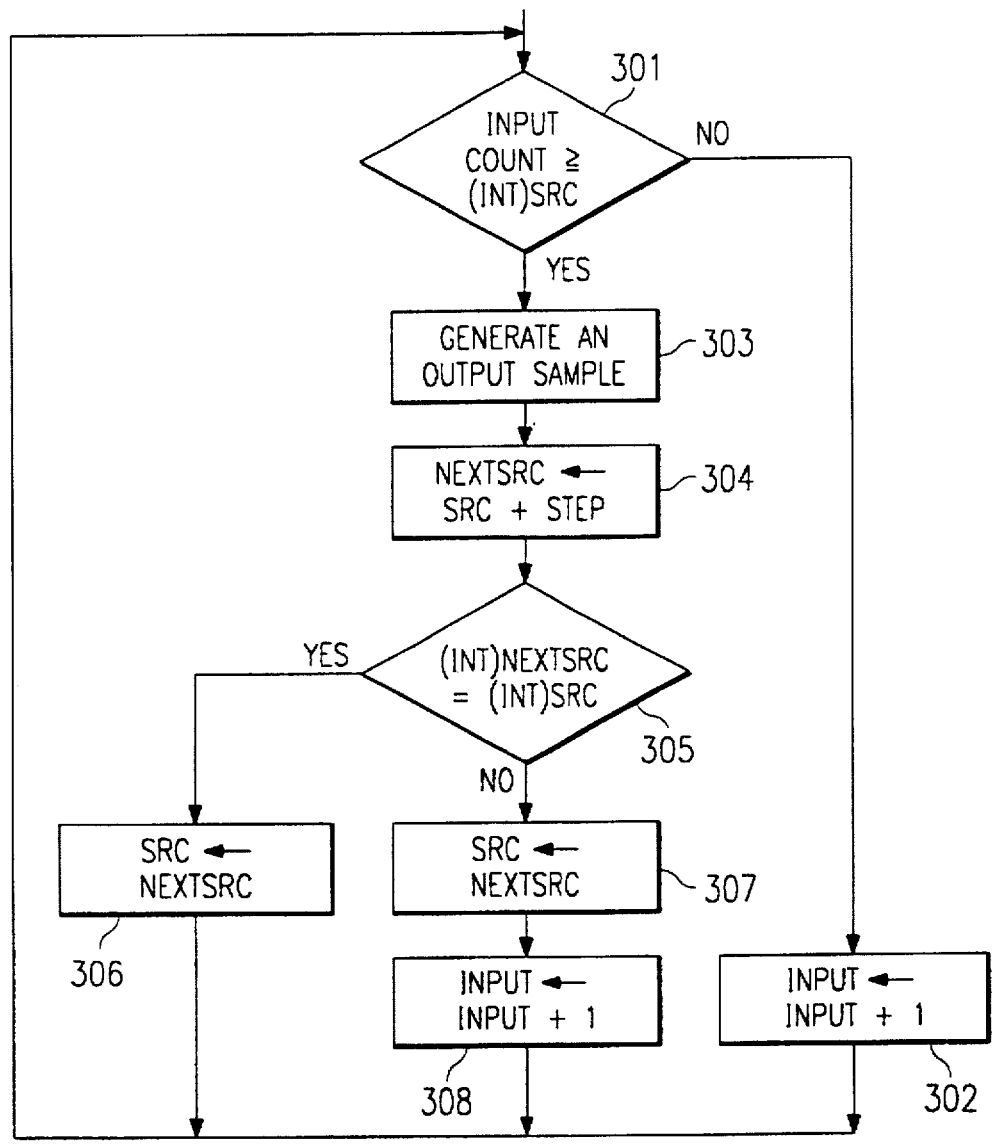
FIG. 3 is a flow chart of currently known logic on which the present invention improves.

As noted above, control circuits are known with logic as illustrated in FIG. 3. Let it be assumed that an input counter is incrementing data samples encountered in an existing data stream, and a source counter, when instructed to do so, is incrementing values of a step. The numeric value of the input counter is compared with the integer value of the source counter (block 301). If the input counter is less than the integer value of the source counter, then a condition found only in decimation will have been encountered, when the step value is sufficiently large to require at this time one or more of the existing data samples to be skipped. The input counter is incremented by 1 (block 302), and the cycle repeats.

If, however, the input counter is greater than or equal to the integer value of the source counter, then a resample is required in this cycle. The control circuit sends an instruction to the resampling filter to resample (block 303), and a calculated value "NEXTSRC" acquires the value of the source counter incremented by one step (block 304). The integer value of the source counter is then compared with the integer value of NEXTSRC (block 305). They are equal, then a condition found only in interpolation will have been encountered, when the step value is sufficiently small to require at this time that the next resample be generated from the same existing data sample neighborhood. In this case, as illustrated in block 306, the source counter is assigned the value of NEXTSRC (i.e. incremented by one step by virtue of the operation of block 304), but the input counter is not incremented in this cycle.

If, on the other hand, the comparison in block 305 shows that the integer values of the source counter and NEXTSRC are not the same, then the source counter is assigned the value of NEXTSRC (block 307) and the input counter is incremented by one (block 308).

As explained in greater detail above, this logic lacks any mechanism to minimize the numeric values of the input counter and the source integer value, and so the circuit must be designed with register capacity to accommodate large numeric values in order to handle long data streams or data streams with many existing data samples.

Figure 2:
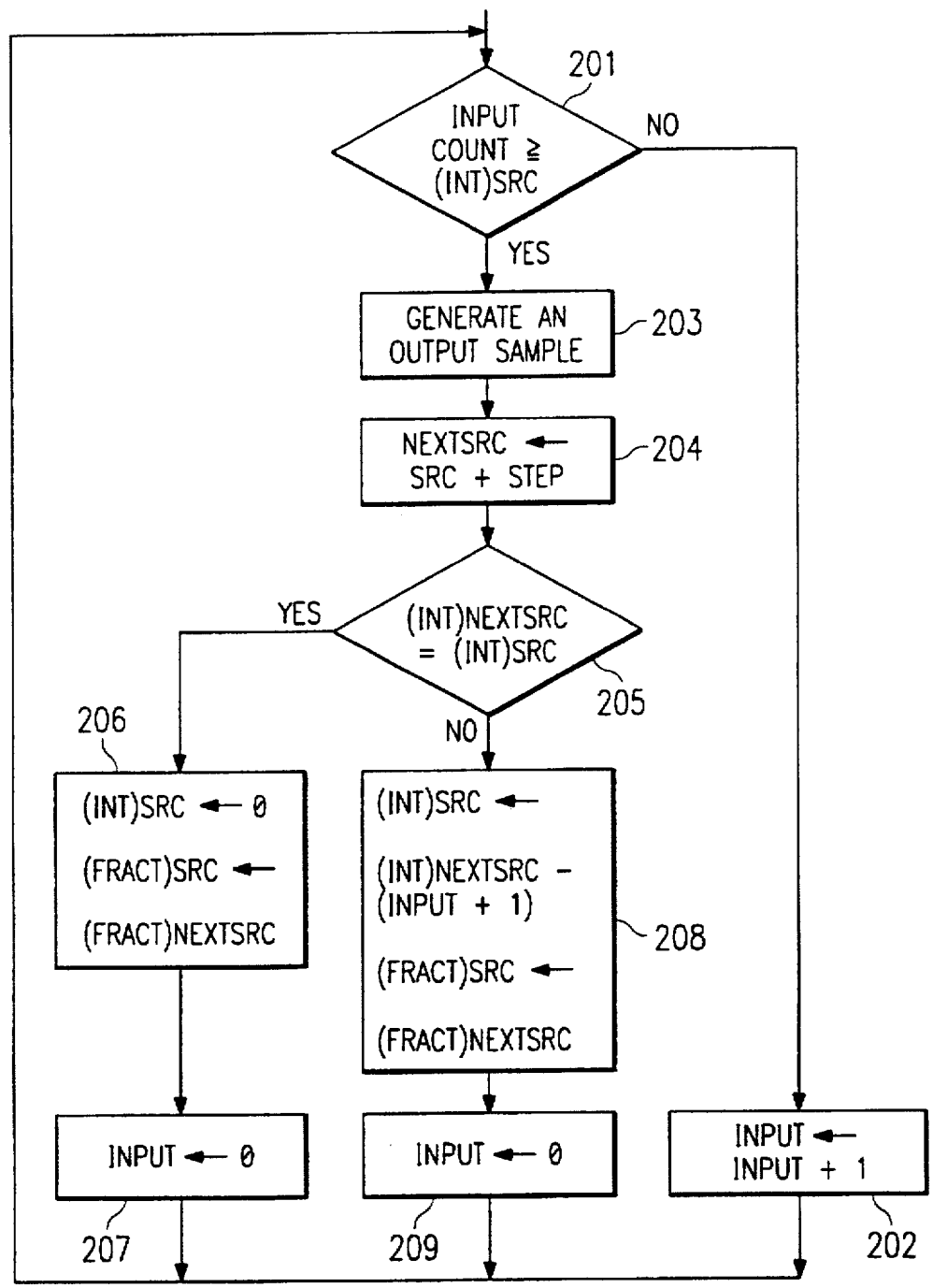
FIG. 2 is a flow chart illustrating the logic of the present invention.

The logic of a control circuit embodying the present invention is illustrated on FIG. 2. Again, let it be assumed that an input counter is incrementing data samples encountered in an existing data stream, and a source counter, when instructed to do so, is incrementing values of a step. Logic similar to FIG. 3 applies if, when the numeric value of the input counter is compared with the integer value of the source counter (block 201), the integer value of the source counter is less than input counter. As before, a condition peculiar to decimation has been encountered whereby one or more existing data samples needs to be skipped, and so resampling is not needed in this cycle. The input counter is therefore incremented by 1 (block 202), and the cycle repeats.

If, however, the input counter is greater than or equal to the integer value of the source counter, then a resample is required in this cycle. As before, the control circuit sends an instruction to the resampling filter to resample (block 203), and calculated value NEXTSRC acquires the value of the source counter incremented by one step (block 204). Once again, the integer value of NEXTSRC is compared with the integer value of the source counter to see if they are equal (block 205).

At this point, the present invention comes into effect. The input counters and the source integer counters are now readjusted downwards (blocks 206, 207, 208 and 209). It will be understood, however, that the integrity of the source counter's fraction value must be preserved, since the resampling filter relies on this fraction value to determine, among other information, the phase in which to resample.

Accordingly, if the integer value of NEXTSRC is found to be equal to the integer value of the source counter, the integer value of the source counter is reset to zero, and the fraction value of the source counter is assigned the fraction value of NEXTSRC (block 206). The input counter is then reset to 0 (block 207). This process takes account of the condition encountered only in interpolation when the step is sufficiently small for the next resample to be required to be generated with reference to the same input date samples. As a result, the input counter is not incremented on this cycle.

If, on the other hand, the integer values of NEXTSRC and the source counter are found not to be equal, then the integer value of the source counter is assigned the integer value of NEXTSRC minus (INP+1), where INP is the current numeric value of the input counter (block 208). The fraction value of the source counter is assigned the fraction value of NEXTSRC. The input counter is then reset to 0 (block 209).

The effect of the foregoing improvement is to limit substantially the numeric values to which the input counter and the source integer counter must count. As best described by example below, let it be assumed resampling is required in order to decimate, and that the step is a value of 1.4. Under logic illustrated in FIG. 3, the first 14 cycles will yield results as follows:

| Input | Source | Inp >= (Int)Src? | Gen Sample? | NEXTSRC |
|---|---|---|---|---|
| 0 | 0 | Yes | Yes | 1.4 |
| 1 | 1.4 | Yes | Yes | 2.8 |
| 2 | 2.8 | Yes | Yes | 4.2 |
| 3 | 4.2 | No | No | 4.2 |
| 4 | 4.2 | Yes | Yes | 5.6 |
| 5 | 5.6 | Yes | Yes | 7.0 |
| 6 | 7.0 | No | No | 7.0 |
| 7 | 7.0 | Yes | Yes | 8.4 |
| 8 | 8.4 | Yes | Yes | 9.8 |
| 9 | 9.8 | Yes | Yes | 11.2 |
| 10 | 11.2 | No | No | 11.2 |
| 11 | 11.2 | Yes | Yes | 12.6 |
| 12 | 12.6 | Yes | Yes | 14.0 |
| 13 | 14.0 | No | No | 14.0 |
| 14 | 14.0 | Yes | Yes | 15.4 |

The input counters and the source integer counters are both at 14. Now compare with results yielded by the logic illustrated in FIG. 2:

| Input | Source | Inp >= (Int)Src? | Gen Sample? | NEXTSRC |
|---|---|---|---|---|
| 0 | 0 | Yes | Yes | 1.4 |
| 0 | 0.4 | Yes | Yes | 1.8 |
| 0 | 0.8 | Yes | Yes | 2.2 |
| 0 | 1.2 | No | No | 2.2 |
| 1 | 1.2 | Yes | Yes | 2.6 |
| 0 | 0.6 | Yes | Yes | 2.0 |
| 0 | 1.0 | No | No | 2.0 |
| 1 | 1.0 | Yes | Yes | 2.4 |
| 0 | 0.4 | Yes | Yes | 1.8 |
| 0 | 0.8 | Yes | Yes | 2.2 |
| 0 | 1.2 | No | No | 2.2 |
| 1 | 1.2 | Yes | Yes | 2.6 |
| 0 | 0.6 | Yes | Yes | 2.0 |
| 0 | 1.0 | No | No | 2.0 |
| 1 | 1.0 | Yes | Yes | 2.4 |

It will be seen immediately that the logic of the present invention has accomplished the same task as in FIG. 3, but that in doing so, the input and source integer counters at no time exceeded 1. Note also that the integrity of the source counter fraction values remain preserved under the logic illustrated by FIG. 2. It will be still further seen by analogy that for any value of step chosen, the input and source counters will never exceed the integer value of the step. Long data streams, or data streams with many samples may thus be analyzed without the need to count to numerically high numbers in the resampling filter control circuitry.

Similar improvements arise if the resampling is instead required in order to interpolate. Let it be assumed that now the step is a value of 0.8. Under the logic illustrated in FIG. 3, the first 14 cycles will yield results as follows:

| Input | Source | Inp >= (Int)Src? | Gen Sample? | NEXTSRC |
|---|---|---|---|---|
| 0 | 0 | Yes | Yes | 0.8 |
| 0 | 0.8 | Yes | Yes | 1.6 |
| 1 | 1.6 | Yes | Yes | 2.4 |
| 2 | 2.4 | Yes | Yes | 3.2 |
| 3 | 3.2 | Yes | Yes | 4.0 |
| 4 | 4.0 | Yes | Yes | 4.8 |

-continued

| Input | Source | Inp >= (Int)Src? | Gen Sample? | NEXTSRC |
|---|---|---|---|---|
| 4 | 4.8 | Yes | Yes | 5.6 |
| 5 | 5.6 | Yes | Yes | 6.4 |
| 6 | 6.4 | Yes | Yes | 7.2 |
| 7 | 7.2 | Yes | Yes | 8.0 |
| 8 | 8.0 | Yes | Yes | 8.8 |
| 8 | 8.8 | Yes | Yes | 9.6 |
| 9 | 9.6 | Yes | Yes | 10.4 |
| 10 | 10.4 | Yes | Yes | 11.2 |

It will be seen that the value of the input counter and the integer value of the source counter are increasing rapidly, and will continue to do so as long as new data samples continued to be encountered in the data stream.

In contrast, however, under the logic illustrated in FIG. 2, the first 14 cycles will yield results as follows:

| Input | Source | Inp >= (Int)Src? | Gen Sample? | NEXTSRC |
|---|---|---|---|---|
| 0 | 0 | Yes | Yes | 0.8 |
| 0 | 0.8 | Yes | Yes | 1.6 |
| 0 | 0.6 | Yes | Yes | 1.4 |
| 0 | 0.4 | Yes | Yes | 1.2 |
| 0 | 0.2 | Yes | Yes | 1.0 |
| 0 | 0 | Yes | Yes | 0.8 |
| 0 | 0.8 | Yes | Yes | 1.6 |
| 0 | 0.6 | Yes | Yes | 1.4 |
| 0 | 0.4 | Yes | Yes | 1.2 |
| 0 | 0.2 | Yes | Yes | 1.0 |
| 0 | 0 | Yes | Yes | 0.8 |
| 0 | 0.8 | Yes | Yes | 1.6 |
| 0 | 0.6 | Yes | Yes | 1.4 |
| 0 | 0.4 | Yes | Yes | 1.2 |

Again, the same logic result has been achieved, and the integrity of the source counter fraction values has been preserved, but the input counter and the source integer counter never get above zero. In an interpolation mode, therefore, the present invention also allows long data streams, or data streams with many samples to be analyzed without the need to count to numerically high numbers in the resampling filter control circuitry.

Figure 1:
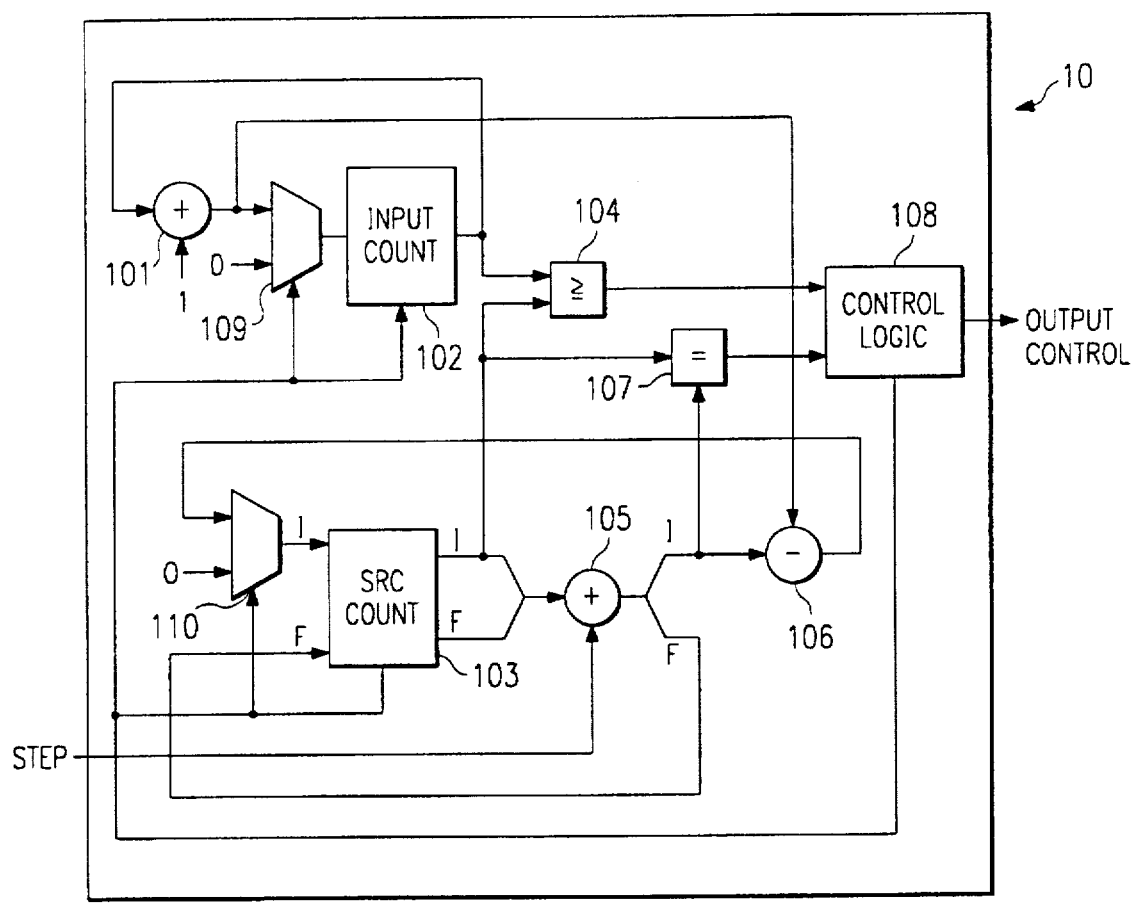
FIG. 1 is a high level block diagram of a circuit embodying the present invention.
Figure 4:
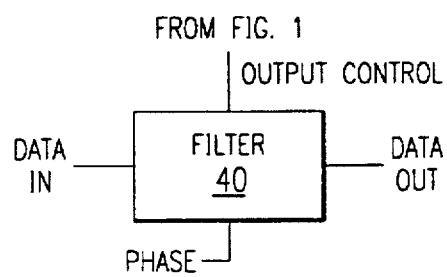
FIG. 4 is a high level block diagram illustrating how output from the circuit illustrated in FIG. 1 may be used to control a resampling filter.

An embodiment of the present invention in a resampling filter control circuit is illustrated on FIGS. 1 and 4. Turning first to FIG. 1, control circuit 10 comprises an input counter 102 and a source counter 103. It will be seen that source counter 103 is able to analyze integer and fraction values separately. The input count is analyzed at gate 104 to see if it is greater than or equal to source count integer value, and the result is fed to control logic 108. If it is not, then control logic 108 adds one to input counter 102 by instructing multiplexer 109 to feed input counter 102 with a cycle from adder 101. The cycle then repeats.

If it is, then control logic 108 sends an instruction to output control to generate a resample, and then looks to gate 107. Gate 107 is analyzing the integer value of source counter 103 to see if it is equal to the integer value of NEXTSRC, the calculated value in adder 105 as it increments the current full, combined integer and fraction value of source counter 103 by the step. If it is equal, then control logic instructs multiplexer 110 to set the integer value of the source counter to zero, while the fraction value of NEXTSRC is extracted from adder 105 and is assigned as the fraction value of source counter 103. Control logic 108 then sends an instruction to multiplexer 109 to reset input counter 102 to zero, and the cycle then repeats.

If gate 107 determines that the source counter integer value is not equal to the integer value of NEXTSRC residing in adder 106, however, then control logic 108 instructs multiplexer 109 to cycle adder 101 and yield a value of the current input count plus one. Subtractor 106 then subtracts this value from the integer value of NEXTSRC residing in adder 105, and the result is assigned as the integer value of source counter 103. The fraction value of NEXTSRC is extracted from adder 105 and is assigned as the fraction value of source counter 103. Control logic 108 then sends an instruction to multiplexer 109 to reset input counter 102 to zero, and the cycle then repeats.

Turning now to FIG. 4, it will be seen that resampling filter 40 is analyzing an incoming data stream and creating a series of output data samples in accordance with the output control circuit 10 as described above on FIG. 1. The phase of the incoming data stream is also fed to resampling filter 40 so that information may be extracted therefrom, if desired, in combination with the fraction value of the source counter as described above.

It will also be understood by those in this art that the logic of the present invention may also be embodied by software executable on a general purpose computer having memory, a central processing unit, and advantageously also a display means.

Although the present invention and its advantages have been described in detail, it should be understood that various changes, substitutions and alterations can be made herein without departing from the spirit and scope of the invention as defined by the appended claims.

I claim:

1. A method for controlling a resampling filter in accordance with a preselected step, said method comprising the steps of:

providing an input counter and a source counter, integer increments of the input counter representing encounters of data samples in a data stream incoming to the resampling filter, numbers processed by the source counter also processable in their integer and fraction portions separately;

comparing the integer value of the source counter with the value of the input counter;

incrementing the input counter by one if the input counter is not greater than or equal to the integer value of the source counter; and generating a resample if the input counter is greater than or equal to the integer value of the source counter, said generating step including the substeps of:

instructing the resampling filter to generate a resample;

assigning to a variable the value of the source counter plus the step;

comparing the integer value of the variable with the integer value of the source counter; and modifying the input counter and the integer value of the source counter, said modifying step including the substeps of:

setting the input counter to zero;

setting the fraction value of the source counter to the fraction value of the variable;

setting the integer value of the source counter to zero if the integer value of the variable is equal to the integer value of the source counter; and setting the integer value of the source counter to the integer value of the variable less one more than the value of the input counter if the integer value of the variable is not equal to the integer value of the source counter.

2. The method of claim 1, in which the data stream incoming to the resampling filter is a digitized video image.

3. The method of claim 2, in which the digitized video image is desired to be enlarged, and the step is preselected to a value less than 1.

4. The method of claim 2, in which the video image is desired to be reduced, and the step is preselected to a value greater than 1.

5. The method of claim 2, in which the value of the preselected step is a function of a scale to which the video image is desired to be resized.

6. The method of claim 1, in which the resampling filter is also processing said incoming data stream in accordance with a phase thereof, and in which the step of instructing further comprises:

informing the resampling filter of the fraction value of the source counter; and analyzing said phase in accordance with said fraction value of the source counter.

7. A circuit for controlling a resampling filter in accordance with a preselected step, said circuit comprising:

an input counter and a source counter, integer increments of the input counter representing encounters of data samples in a data stream incoming to the resampling filter, numbers processed by the source counter also processable in their integer and fraction portions separately;

means for comparing the integer value of the source counter with the value of the input counter;

means for incrementing the input counter by one if the input counter is not greater than or equal to the integer value of the source counter; and means for generating a resample if the input counter is greater than or equal to the integer value of the source counter, said generating means including:

means for instructing the resampling filter to generate a resample;

means for assigning to a variable the value of the source counter plus the step;

means for comparing the integer value of the variable with the integer value of the source counter; and means for modifying the input counter and the integer value of the source counter, said modifying means including:

means for setting the input counter to zero;

means for setting the fraction value of the source counter to the fraction value of the variable;

means for setting the integer value of the source counter to zero if the integer value of the variable is equal to the integer value of the source counter; and means for setting the integer value of the source counter to the integer value of the variable less one more than the value of the input counter if the integer value of the variable is not equal to the integer value of the source counter.

8. The circuit of claim 7, in which the data stream incoming to the resampling filter is a digitized video image.

9. The circuit of claim 8, in which the digitized video image is desired to be enlarged, and the step is preselected to a value less than 1.

10. The circuit of claim 8, in which the video image is desired to be reduced, and the step is preselected to a value greater than 1.

11. The circuit of claim 8, in which the value of the preselected step is a function of a scale to which the video image is desired to be resized.

12. The circuit of claim 7, in which the resampling filter is also processing said incoming data stream in accordance with a phase thereof, and in which the means for instructing further comprises:

means for informing the resampling filter of the fraction value of the source counter; and means for analyzing said phase in accordance with said fraction value of the source counter.

13. A circuit for controlling a resampling filter in accordance with a preselected step, said circuit comprising:

a control means;

an input counter and a source counter, integer increments of the input counter representing encounters of data samples in a data stream incoming to the resampling filter, numbers processed by the source counter also processable in their integer and fraction portions separately;

a first adder, the first adder storing a value of the input counter incremented by one;

a first multiplexer, the first multiplexer setting the input counter either to the value of the first adder or to zero according to instructions from the control means;

a first gate, the first gate informing the control means whether the value of the input count is greater than or equal to the integer value of the source count, the control means instructing the first multiplexer to set the input counter to the value stored in the first adder when the value of the input counter is not greater than or equal to the integer value of the source counter;

a second adder, the second adder storing a value of the source counter incremented by one step;

a subtractor, the subtractor storing a value of the integer value of the second adder less the value of the first adder;

a second multiplexer, the second multiplexer setting the integer value of the source counter input counter either to the value of the first subtractor or to zero according to instructions from the control means;

a second gate, the second gate informing the control means whether the integer value of second adder is equal to the integer value of the source counter;

the control means instructing (1) the resampling filter to generate a sample and (2) the first multiplexer to set the input counter to zero and (3) the second multiplexer to set the integer value of the source counter to zero and the fraction value of the source counter to the fraction value of the second adder, the control means making all three of said instructions when the value of the input counter is greater than or equal to the integer value of the source counter and the integer value of second adder is equal to the integer value of the source counter; and the control means instructing (1) the resampling filter to generate a sample and (2) the first multiplexer to set the input counter to zero and (3) the second multiplexer to set the integer value of source counter to the integer value of the subtractor and the fraction value of the source counter to the fraction value of the second adder, the control means making all three of said instructions when the value of the input counter is greater than or equal to the integer value of the source counter and the integer value of second adder is not equal to the integer value of the source counter.

14. The circuit of claim 13, in which the data stream incoming to the resampling filter is a digitized video image.

15. The circuit of claim 14, in which the digitized video image is desired to be enlarged, and the step is preselected to a value less than 1.

16. The circuit of claim 14, in which the video image is desired to be reduced, and the step is preselected to a value greater than 1.

17. The circuit of claim 14, in which the value of the preselected step is a function of a scale to which the video image is desired to be resized.

18. The circuit of claim 13, in which the control means also informs the resampling filter of the fraction value of the source counter.

19. A computer program product having a computer readable medium having computer readable logic recorded thereon for controlling a resampling filter in accordance with a preselected step, said computer program product also in a computer system having a processor, a display device and a memory, said computer program product comprising:

input counting means and source counting means, integer increments of the input counting means representing encounters of data samples in a data stream incoming to the resampling filter, numbers processed by the source counting means also processable in their integer and fraction portions separately;

means for comparing the integer value of the source counting means with the value of the input counting means;

means for incrementing the input counting means by one if the input counting means is not greater than or equal to the integer value of the source counting means; and means for generating a resample if the input counting means is greater than or equal to the integer value of the source counting means, said generating means including:

means for instructing the resampling filter to generate a resample;

means for assigning to a variable the value of the source counting means plus the preselected step;

means for comparing the integer value of the variable with the integer value of the source counting means; and means for modifying the input counting means and the integer value of the source counting means, said modifying means including:

means for setting the input counting means to zero;

means for setting the fraction value of the source counting means to the fraction value of the variable;

means for setting the integer value of the source counting means to zero if the integer value of the variable is equal to the integer value of the source counting means; and means for setting the integer value of the source counting means to the integer value of the variable less one more than the value of the input counting means if the integer value of the variable is not equal to the integer value of the source counting means.

20. The computer program product of claim 19, in which the data stream incoming to the resampling filter is a digitized video image.

21. The computer program product of claim 20, in which the digitized video image is desired to be enlarged, and the step is preselected to a value less than 1.

22. The computer program product of claim 20, in which the video image is desired to be reduced, and the step is preselected to a value greater than 1.

23. The computer program product of claim 20, in which the value of the preselected step is a function of a scale to which the video image is desired to be resized.

24. The computer program product of claim 19, in which the resampling filter is also processing said incoming data stream in accordance with a phase thereof, and in which the means for instructing further comprises:

means for informing the resampling filter of the fraction value of the source counting means; and means for analyzing said phase in accordance with said fraction value of the source counting means.

* * * * *